May 23, 1933.  J. SNEED  1,910,187
LINK
Filed July 24, 1928
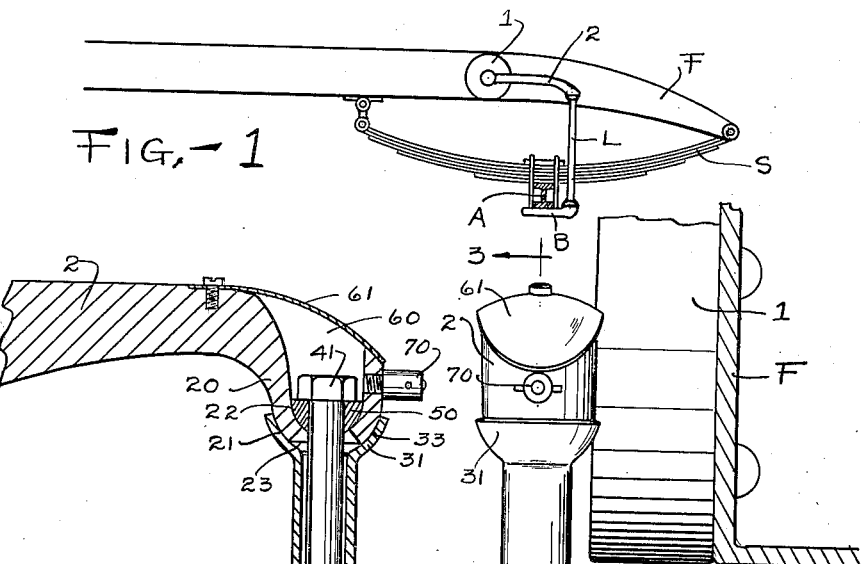
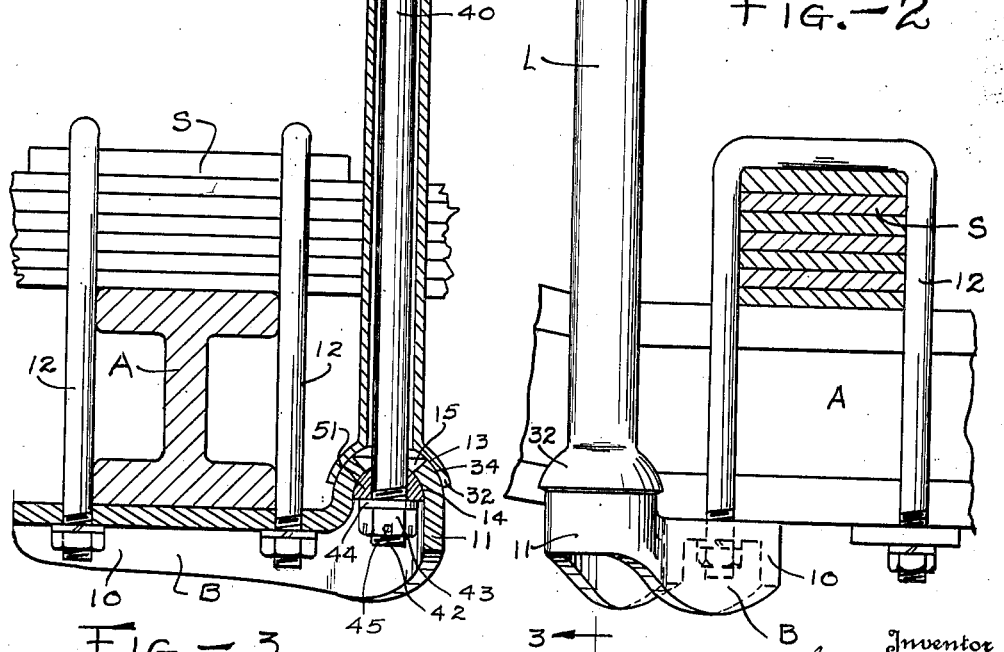

Patented May 23, 1933

1,910,187

UNITED STATES PATENT OFFICE

JOHN SNEED, OF FERNDALE, MICHIGAN

LINK

Application filed July 24, 1928. Serial No. 295,010.

This invention relates to links or connecting rods and particularly to a link adapted to be universally connected at its ends and carry loads both in tension and in compression.

I choose to illustrate my link in the environment of a connecting rod for shock absorbers acting between the sprung and unsprung parts of a motor vehicle. The uses of my link however, are manifold and I do not regard my invention as being limited by the particular application shown and described herein. It is well known that various types of shock absorbers or rebound control devices are used which are generally carried on the side rail of a motor vehicle frame and which are connected to the axle of the vehicle through an arm and a link. The link which connects the arm and the axle of the vehicle must be at least pivotally connected at both ends because of the oscillation between the frame and the axle and is preferably universally connected at both ends because of side sway between the frame and axle.

It is among the objects of my invention to provide a link having universal connections at both ends and which acts both in tension and in compression. Another object is to provide a link of simple construction adapted to be used in connection with the shock absorber or rebound control of a motor vehicle. Another object is to arrange a link of separate parts, which parts cooperate to form both as the body of the link and the universal connections at the ends thereof. A further object is to arrange a link wherein by simple adjustment compensation may be had for wear. Another object is to provide parts for engaging the ends of the link to facilitate a universal connection between the parts and the link. Another object is to provide means for lubricating the wearing parts of the link and for maintaining a reservoir of lubricant adjacent the wearing parts. A further object is to provide a connection for at least one end of the link in the form of a simple stamping to which the link may be secured for universal movement.

Other objects will appear from the following description of a preferred form of my invention, reference being had to the accompanying drawing. The essential characteristics are summarized in the claims.

In the drawing, Fig. 1 is a side elevation of a portion of a motor vehicle showing my link associated with a shock absorber; Fig. 2 is an enlarged front elevation of my link and the associated parts of the vehicle; and Fig. 3 is a section taken along the line 3—3 of Fig. 2.

Referring particularly to Fig. 1, I have illustrated the conventional side frame member F of a motor vehicle which is supported in the usual way by leaf spring S. The leaf spring is carried on an oscillating axle A. A shock absorber 1 is secured to the side frame member and has an oscillating arm 2. Connecting the end of the arm and the axle A, I provide my link L which is secured at the top to the arm 2 and is secured at the bottom to a bracket B. In the operation of the vehicle, the oscillations of the axle A relative to the frame are controlled through the shock absorber, the forces exerted during the control being carried both in tension and compression through the link L.

Referring particularly to Figs. 2 and 3, I show in greater detail the construction of the link and its relationship to the members between which it is connected. The bracket B is preferably pressed from sheet stock into a channel part 10 and into an offset downwardly facing cupped end 11. The channel part may be secured to the axle by means of U-bolts 12 which secure the spring to the axle. The cupped end part 11 of the bracket has an exterior upwardly facing spherical surface 13, see Fig. 3, and a concentric interior spherical surface 14. An aperture 15 is punched out in the upper surface of the cupped end through which part for the link structure extends. The arm 2 of the shock absorber is formed at its end to be connected to the link L and has an upwardly facing cupped end 20 similar to the cupped end 11 of the bracket B. The cupped end 20 of the arm has an exterior downwardly facing spherical surface 21 and a concentric interior spherical surface 22 with a central aperture 23.

The link proper comprises a tubular sleeve part 30 which may be formed of seamless or welded tubing and has its ends flared outwardly as at 31 and 32 to form substantially spherical inwardly facing bearing surfaces 33 and 34. These surfaces are struck from the same radius as the surfaces 13 and 21 and contact with the surfaces 13 and 21, as shown. The sleeve part 30 of the link comprises the compression member and is generally supported at both ends by the exterior surfaces of the cupped ends of the bracket and arms respectively.

The tension member of the link is essentially a rod or cap screw 40 having a head 41 and a threaded end 42. Retained between the head 41 and the interior surfaces of the cupped end of the arm 2 is a bushing 50 which may be a separate piece having an exterior spherical surface fitting the interior of the cupped part of the arm. At the bottom of the link a similar bushing 51 is held against the interior of the cupped part of the bracket B by a castellated nut 43. Such means as a lock washer 44 and a cotter pin 45 serve to secure the nut in a given position. Forces in tension between the arm and bracket are delivered through the rod or cap screw 40 via the bushings 50 and 51 which permit universal movement between the rod and the parts between which it is connected.

It will be seen that when the nut 43 is turned up on the screw 40 that the cupped parts of the arm and bracket are forced into the spherically flanged ends of the tube 30 and that the wearing parts are drawn into close engagement. It will further be seen that as the engaging surfaces are worn in use that they may be taken up by tightening the nut 43. It will further be appreciated that the spherical wearing surfaces at each end of the link are concentric and that universal movement is provided at both ends of the link with the arm and bracket respectively. The relative strength of the tube and the rod may be apportioned according to the loads to be placed upon them and if like loads in tension and compression are to be carried, the size and strength of the parts may be so apportioned.

Referring particularly to Fig. 2, a chamber 60 is provided in the end of the arm 2 which may be covered by such means as a plate 61 suitably attached to the arm. This chamber may constitute a reservoir for lubricant and as the link is disposed in a vertical position, the lubricant working through the upper joint may pass downwardly between the sleeve and rod to the lower joint. In effect the chamber 60 constitutes a reservoir for the upper joint and the space between the rod and the sleeve constitutes a reservoir for lubricant for the lower joint. If desired such means as the conventional lubricant fitting 70 may be threaded into the cupped end of the arm.

The assembly and removal of parts is simple in that the sleeve is first positioned to exteriorly engage the cupped ends, then the upper bushing may be dropped in place and the rod passed through the bushing and sleeve. Thereupon, the lower bushing may be slipped over the lower end of the rod and forced upwardly by the nut at the bottom of the rod. The tightening of the nut 43 completes the assembly and determines the freedom or proximity of the bearing surfaces.

It will appear from the foregoing that I have provided a link of eminently simple parts which can be readily assembled; that all the parts may be easily made and that adjustment and compensation of the wearing parts is readily facilitated; that the structure avails itself of easy and complete lubrication, and that while I have illustrated and described my preferred form of my invention and a particular embodiment in connection with shock absorbers for motor vehicles, I do not care to be limited in this or any manner other than by the claims appended hereto.

I claim:—

1. A link comprising a tubular part with its ends flared to present substantially concave spherical bearing surfaces, a rod disposed within the tubular part with substantially spherical convex bearing parts adjacent to and spaced from the bearing surfaces of the tubular part.

2. A link comprising a tubular part with its ends flared to present substantially concave spherical bearing surfaces, a rod disposed within the tubular part and extending beyond the ends thereof in combination with parts between which the link is connected having convex bearing parts engaging the ends of the tubular part and secured by said rod.

3. A link comprising a compression member with spherically formed bearing parts at its ends and a tension member with spherically formed parts at its ends, one of said bearing parts presenting a concave bearing surface and the other of said bearing parts presenting a convex bearing surface and means for adjusting the effective length for at least one of said members, in combination with pieces between which the link extends each piece being cup shaped with oppositely facing concave and convex bearing surfaces engaged on opposite sides by a pair of said bearing parts.

4. The combination of a pair of parts to be connected, and a link for connecting said parts, each of said parts having concentric concave and convex bearing surfaces, said link comprising a tension member having convex spherical parts engaging the concave bearing surfaces at opposite ends, said link also having a compression member with concave bearing surfaces at both ends engaging the convex bearing surfaces of said parts.

5. The combination of a pair of members to be connected together, each of said members having a cupped part, said cupped parts having apertures in the bases thereof facing each other, and a link for connecting said members associated at its ends with said cupped parts and comprising a tension member extending through said apertures and bearing against the interior of said cupped parts and a compression member extending coaxially of said tension member and bearing against the exterior of said cupped parts.

6. The combination of a pair of members to be connected together, each of said members having a cupped part, said cupped parts having apertures in the bases thereof facing each other, and a link for connecting said members associated at its ends with said cupped parts and comprising a member extending through said apertures and bearing against the interior of said cupped parts and a member bearing against the exterior of said cupped parts and spacing them from each other.

7. The combination of an arm having an upwardly facing cupped end with an aperture in the base thereof, a bracket disposed below said arm and having a cupped end with an aperture therein, a link for connecting said arm and said bracket comprising a vertically extending sleeve with outwardly flared ends engaging the exterior surfaces of said cupped parts adjacent the apertures therein, and means disposed within said sleeve for holding said cupped parts in contact with the flared ends of said sleeve, the upwardly facing cupped end of the arm constituting a primary reservoir for lubricant, and the sleeve constituting a secondary reservoir for lubricant.

8. The combination of a pair of members to be connected, said members having cupped parts with apertures in the bases of the cups facing each other, the surfaces of the walls of the cups adjacent the apertures conforming to concentric spheres, and a link for connecting said members together and having universal movement with relation to each of said members comprising a tubular compression member having its ends flared to present concave spherical surfaces to the exterior of said cupped parts, and a tension member comprising a rod disposed within said tubular member and carrying spherically formed bushings at its ends which engage the interior surfaces of said cupped ends and a nut at one end of the rod for drawing said parts into intimate contact with the bearing surfaces of both cupped parts.

9. An arm with a cupped like part formed in the end thereof, the base of the cup extending downwardly and having an aperture formed therein and the brim of the cup lying generally horizontally at the top thereof, a bracket having a similar cupped part disposed with its base extending upwardly, a link for connecting said arm to said bracket having bearing parts associated with said cup like parts, said link being at least in part hollow and comprising a chamber between the cup like parts, a closure member lying upon the brim of the upper cup like part, means for forcing lubricant into the upper cup like part and retaining lubricant therein above the wearing parts, the hollow part of the link comprising a reservoir for lubricant for the wearing parts at the lower end of the link.

10. The combination of a pair of members to be connected, one of said members being disposed generally above the other of said members, the upper member having an upwardly facing cupped end, the lower member having a downwardly facing cupped end, both of said cupped ends having central apertures in the bases thereof, a link connecting said members and associated at its ends with the said cupped ends of the members, said link comprising a tubular part engaging the exterior surfaces of the cupped ends, and a cap screw lying within said tubular part, and a pair of bushings one secured between the head of the cap screw and the interior of the upper cupped end and the other disposed within the lower cupped end, and a nut for said cap screw disposed within the lower cupped end and supporting the lower bushing and drawing said cupped ends toward each other for determining the engagement between said link and the said cupped ends.

11. The combination of a bracket comprising a downwardly facing channel part with a downwardly facing cupped end, and a link connecting the end of said bracket to an agency relatively movable thereto, said link comprising a tubular part with an outwardly flared end engaging the outside of the cupped end of the bracket and means engaging the inside of the cupped end of the bracket.

12. A pair of members to be connected, each of said members having a cupped part, said cupped parts having spherical surfaces and apertures in the bases thereof facing each other, and a link for connecting said members associated at its end with said cupped parts and comprising a tension member extending thru said apertures and bearing against the cupped parts with conforming spherical surfaces, and a compression member extending coaxially of said tension member and exterior to it and bearing against the said cupped parts with conforming spherical surfaces.

13. The combination of a pair of members to be connected, said members having cupped parts with apertures in the bases of the cups facing each other, the surfaces of the walls of the cups adjacent the apertures conforming to concentric spheres, and a link for connecting said members together and having universal movement with relation to each of said members comprising a tubular compression member, its ends presenting spherical surfaces to the less remote bearing surfaces of said cupped parts, and a tension member comprising a rod disposed within said tubular member and carrying spherically formed bushings at its ends which engage the more remote bearing surfaces of the cupped members.

14. A combination of a pair of parts to be connected having cupped ends and apertures in the bases thereof, and a link bearing loads of both tension and compression for connecting said parts, comprising a tube with outwardly cupped ends having bearing surfaces engageable with said cupped ends, conforming cupped bushings engaging the interior surfaces of said cupped ends, and means at each end of the link extending through the aligned apertures of both parts and ends of the link for drawing and holding said ends in intimate contact with the bearing surfaces of both cupped parts allowing universal movement at each end of the link thereby.

15. A link comprising a tubular compression member having substantially spherical bearing surfaces on its ends, a tension member disposed within said compression member and having substantially spherical bearing parts on its ends, the bearings on one of said members being convex and on the other of said members being concave, said concave and convex bearings being spaced from each other.

In testimony whereof, I hereunto affix my signature.

JOHN SNEED.